(12) United States Patent
Allen

(10) Patent No.: US 9,697,028 B1
(45) Date of Patent: Jul. 4, 2017

(54) DIRECTED PLACEMENT FOR REQUEST INSTANCES

(71) Applicant: Amazon Technologies, Inc., Reno, NV (US)

(72) Inventor: Nicholas Alexander Allen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 253 days.

(21) Appl. No.: 14/106,564

(22) Filed: Dec. 13, 2013

(51) Int. Cl.
*G06F 9/455* (2006.01)

(52) U.S. Cl.
CPC ................................ *G06F 9/45545* (2013.01)

(58) Field of Classification Search
CPC .................................................. G06F 9/45545
See application file for complete search history.

(56) References Cited

U.S. PATENT DOCUMENTS

| | | | | |
|---|---|---|---|---|
| 7,237,016 B1* | 6/2007 | Schober | .................. | G06F 15/02 709/223 |
| 8,392,928 B1* | 3/2013 | Forys | .................... | G06F 9/5061 718/104 |
| 8,397,204 B2* | 3/2013 | Sengupta | .................. | G06F 9/50 716/132 |
| 8,904,383 B2* | 12/2014 | Bash | ....................... | G06F 1/206 713/300 |
| 9,052,935 B1* | 6/2015 | Rajaa | ................... | G06F 9/45533 |
| 9,075,788 B1* | 7/2015 | Roth | ....................... | G06F 11/25 |
| 2005/0278690 A1* | 12/2005 | Lin | ........................ | G06F 9/5061 717/104 |
| 2011/0161968 A1* | 6/2011 | Bash | ..................... | G06F 9/5094 718/102 |
| 2013/0305258 A1* | 11/2013 | Durant | .................. | G06F 9/4881 718/106 |

OTHER PUBLICATIONS

Media Wiki Zen Server, "Intel Platform QoS Technologies," this page was last modified on Jun. 22, 2016, at 12:22, retrieved from https://wiki.xenproject.org/wiki/Intel_Platform_QoS_Technologies, 5 pages.

* cited by examiner

*Primary Examiner* — Charlie Sun
(74) *Attorney, Agent, or Firm* — Davis Wright Tremaine LLP

(57) ABSTRACT

Techniques for placing guest virtual machines on a distributed and/or virtualized computer system while obeying communications latency constraints are described herein. A placement map is created with regions based on available capacity measurements of one or more host machines in a virtualized computer system. Requests to place one or more guest virtual machines on the host machines are retrieved and the placements are optimized by iteratively assigning the requests to the regions in the map such that constraints are satisfied but capacity may be exceeded and then reassigning those requests that violate available capacity. The iterative process completes when a valid placement map is produced.

25 Claims, 12 Drawing Sheets

DIRECTED PLACEMENT FOR REQUEST INSTANCES

BACKGROUND

Modern distributed computer systems are frequently implemented with a plurality of guest virtual computing systems that operate on one or more host computer environments. Such computer systems often create, destroy, suspend and resume guest virtual systems on a regular basis and may need efficient algorithms to allocate the guest virtual machines to the host computer environments when placing and instantiating the guest virtual machines. Inefficient placement algorithms may consume significant time in placing the guest virtual machines as they are instantiated, particularly when there are a large number of host systems or when those host systems are overly crowded. Frequently such placement algorithms do not scale well, becoming increasingly slow when the numbers of guest virtual machines and host computer environments grow. As the size and complexity of distributed and/or virtualized computing systems increases, inefficient placement and instantiation of guest virtual computing systems on host computer environments may lead to system slowdowns and/or outages and may adversely affect system availability and performance.

BRIEF DESCRIPTION OF THE DRAWINGS

Various embodiments in accordance with the present disclosure will be described with reference to the drawings, in which.

DETAILED DESCRIPTION

Figure 1:
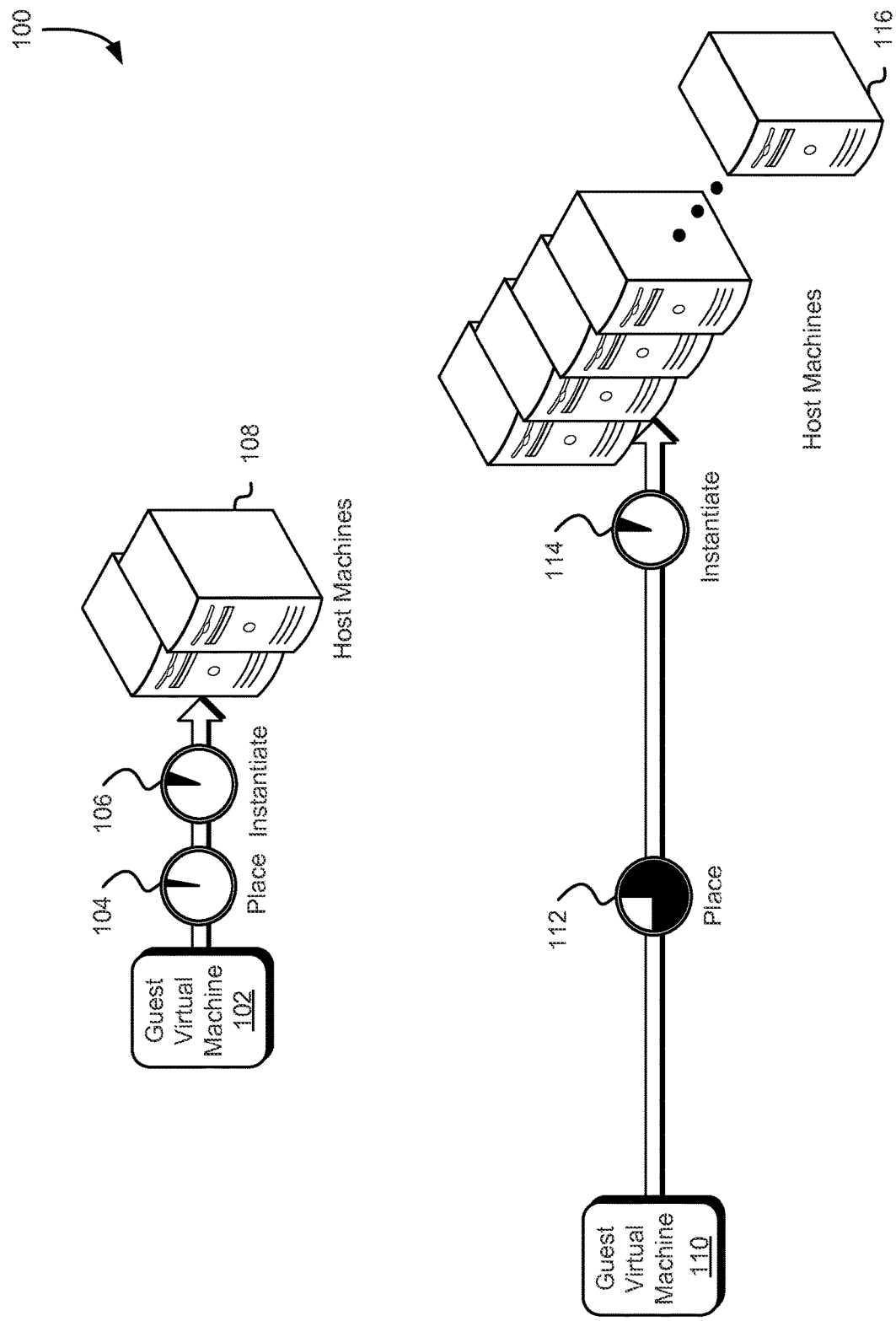
FIG. 1 illustrates an example environment where guest virtual machines are placed on computer systems in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods, systems and processes for placing guest virtual machines on host computer environments on computing systems and executable code operating thereon. In particular, techniques are disclosed for utilizing processor capabilities to efficiently and accurately determine efficacious placements of operational elements of computer systems, including, but not limited to, guest computer systems, guest applications, controlling domains such as hypervisors or domain zero domains, while a plurality of such operational elements are running on one or more computer systems as part of a distributed, virtualized and/or datacenter environment. A distributed, virtualized and/or datacenter environment may benefit from efficient and accurate placement of guest operational elements in order to facilitate better instantiation and management of those elements and better overall system performance. As may be contemplated, this need for efficiency and accuracy may be particularly true in computer environments where the system includes a large number of guest operational elements, or a highly complex system architecture, or a large number of constraints on the interrelationships between the guest operational elements, or a large number of host computing systems, or a complex variety of different types of guest operational elements with varying resource needs, or a frequent number of instantiations or a combination of these and/or other factors which may increase system complexity. As also may be contemplated, this need for efficiency and accuracy may become more pronounced as the system scales in a number of ways. As an illustrative example, consider a distributed computer system with a small number of host machines supporting a small number of guest virtual machines with relatively simple interrelationships and few instantiations. In such a system, a placement algorithm may be able to determine where to place a guest virtual machine in, for example, a few milliseconds and then may be able to instantiate the guest virtual machine in a few seconds. However, if the system were scaled to thousands of guests of multiple types on hundreds of hosts, the same placement algorithm may take several seconds to even determine where to place the guest virtual machine before instantiation, and the system may incur the increased cost of placement on each and every instantiation.

Techniques disclosed herein include employing computing system resources to place guest virtual machines on host computing environments in a distributed, virtualized and/or datacenter computer environment (i.e. a distributed and/or virtualized computer system hosted in a datacenter facility, also referred to simply as "a datacenter", "a datacenter computer environment" or "a computer system"). As may be contemplated, a distributed, virtualized and/or datacenter computer environment is used as an illustrative example and the techniques disclosed herein may apply to distributed and/or virtualized computer systems spread across multiple datacenters. One or more guest virtual machines (also referred to as a virtual machine, a VM, a virtual machine instance, a guest instance, a guest machine, a guest domain, an application domain, a guest or other such terms) may be ready for instantiation on host computing environments. Lists and/or sets of guest virtual machines may be stored in a data structure such as a queue, a list, a map, a hash or any other such data structure, or may be stored in a database, or arrive via an API call or may be presented to the system in a combination of these and/or other such methods. Each of the guest virtual machines may be a member of a set containing one or more guest virtual machines. In some embodiments, each of the guest machines may have constraints on the relationships between the guest machine and one or more other guest machines. For example, a guest virtual machine may be constrained to run on the same host computing environment of some of the guest virtual machines and may also be constrained to run near (as measured by maximum values of latency, minimum values of data throughput, certain types of communications protocols and/or a combination of these and/or other such measurements) some of the other guest virtual machines. As may be contemplated, sets of guest virtual machines may contain other sets of guest virtual machines and constraints may exist between sets of guest virtual machines as well as between individual virtual machines.

In some embodiments, the placement of guest virtual machines may be managed by a placer which may be implemented as one or more processes running on one or more computer system entities on a distributed, virtualized and/or datacenter computing environment. In some embodiments, a placer may be a supervising process that communicates and/or controls individual hypervisor or domain zero objects on the host computer environments, or it may be a specified and/or specialized controlling domain such as a hypervisor or a domain zero that is at least configured to determine locations for the placement of guest virtual machines, or it may be a collection of controlling domains which may work cooperatively to place guest virtual machines or it may be a combination of these and/or other such controlling domain elements.

In order to facilitate fast and efficient placement of sets of pending guest virtual machines, a placer may first query the computing system for information about the computing system and about the relationships between the elements of the computing system. This information may include information such as the current and maximum number of guest virtual machines that may be instantiated on each of the host computing environments, the available and total system resources for each of the host computing environments, the communications latencies between each of the host computing environments, the data throughput between each of the host computing environments and other such information. The information may allow the placer to construct a placement map that may show, for example, the available number of guest virtual machine locations for at least a portion of the host computing environments and the distances between those host machines as measured by, for example, the communication latencies between those host machines. In some embodiments, the placement map may be represented by a weighted graph where each of the nodes of the graph represents a host computing environment with a node that contains the number of available machine slots for that host while the weighted edges of the graph represent the distances between those host machines, measured in, for example, communication latency times. In some embodiments, a placement map may be represented by areas that correspond to available capacity for host machines within a certain legal region and the physical proximity of the representational areas on the map may represent the distances between those capacities. As may be contemplated, other representations may be used to construct the placement map including, but not limited to, graphs, trees, forests, matrices, systems of equations, constraint systems and other such representations and/or combinations of such representations.

After constructing a placement map that represents at least a portion of the capacities of host machines within a legal region and latency-based distances of a distributed, virtualized and/or datacenter computing environment, a placer may begin retrieving placement requests from a list, map, queue or other such data structure that may contain sets of placement requests. In some embodiments, the requests may contain requests to place one or more guest virtual machines and may also contain one or more sets of constraints or penalty forces between the one or more guest virtual machines and/or between other guest virtual machines on the system. For example, a simple request may be to place two machines anywhere on the system with available capacity. Such a request has no constraints or penalty forces between the two machines. A more complex example request may include a request to place a first set of three machines together with minimal latency such as if they were all placed on the same host together, and a second set of three other machines also with minimal latency such as if they were all also placed on the same host together and with an added constraint that they should have a very small latency with respect to the first three machines such as if they were placed on a different host but nearby on the same network. Such a request would have constraints between the machines in the first set of three machines, constraints between the machines in the second set of three machines and constraints between the two sets of machines. As may be contemplated, the data structure that contains the sets of requests may include considerably more complex requests in some embodiments. For example, a computer service may include an initial request for some number of machines of one type, some other number of machines of a second type, and some other number of machines of a third type, with constraints between the sets of the machines and also constraints between the individual machines. In such an example, the computer service may later scale up, and may request additional guest machines that may be constrained to guest machines already operating on the system at the time of the request and/or constraints to other newly instantiated guest virtual machines.

After retrieving one or more placement requests, the placer may begin to determine the proper placement by translating the pending requests into a format that is compatible with the placement map. For example, in a representation where the areas of the legal regions correspond to available capacity for the host machines within that legal region and where proximal distances between the legal regions correspond to communications latencies between those legal regions, a request may be translated to representative request areas with one or more constraint or penalty forces between the machines and/or between the sets of machines. In some embodiments, where the machines and/or the sets of machines can be placed anywhere, there may be no constraint or penalty forces between the machines and/or between the sets of machines. The placer may begin to determine the proper placement by first placing the machines in such a way as to minimize constraint or force penalties but with no regard to whether the placed capacity requests exceed the available capacity for each legal region. In this initial placement, a legal region may be assigned more virtual machines than it has capacity for but machines and/or sets of machines may be located, as much as possible, close enough to each other as their constraints may dictate. The initial placement of the requested capacities may be illegal as far as it may exceed capacity but should satisfy constraint requirements. As may be contemplated, the initial placement serves to place the request capacities on the placement map without a legality concern so that such initial efficient placements may be done quickly and while it may not be a legal solution, it may be a solution in that the constraints may be satisfied.

Following the initial placement, the placer may begin an iterative process to legalize the solved map. The placer may first identify one or more legal regions on the placement map wherein placed capacity requests combined with previously placed machines may exceed the available capacity of the legal region. The placer may then attempt to address the issue of the exceeded capacity by moving one or more of the capacity requests in the identified oversubscribed legal region to another legal region. In some embodiments, as part of the operation in moving one or more capacity requests from an identified oversubscribed legal region to a second, less crowded legal region, the placer may first relocate some of the capacity requests from the second legal region to a third legal region. As may be contemplated, the placer may also elect to move one or more capacity requests such that the second legal region may be oversubscribed. As also may be contemplated, the placer may elect to swap capacity requests between legal regions in order to reduce capacity in one or both. For example, consider a first legal region with a capacity of eight virtual machines and four virtual machines already placed and a second legal region, also with a capacity of eight virtual machines and with two virtual machines already placed. If an initial placement map puts six new machines in the first legal region and two new machines in the second legal region, the first legal region is oversubscribed. The placer may then swap the requests and put the six new virtual machines in the second legal region and the two new virtual machines in the first legal region, thereby removing the oversubscribed state.

At each iteration, the placer may evaluate whether a particular placement arrangement is a legal one and may also evaluate whether the constraints between machines and/or between sets of machines have been satisfied. In some embodiments, the placer may calculate a difference between the force penalties of the constraints of a potentially illegal solution and the force penalties of the constraints of a legalized solution and when that difference falls below a determined threshold value, may accept the legalized solution as a valid placement solution. In some embodiments, the placer may determine a static threshold value at system startup, or may determine a threshold value based on one or more system measurements at system placement time, or may adjust the threshold value based on one or more system measurements during system placement or may determine and/or adjust the threshold using a combination of these and/or other such methods. As may be contemplated, threshold values may be determined and/or adjusted based on a variety of system factors including, but not limited to, system load, system resource demand, system resource pressure, complexity of the requests, resources contained in the guest machines, business value of the guest machines, the nature of the customer, client or owner of the guest machines or a combination of other such factors. For example, in some embodiments the placer may begin with a tight threshold value, but may relax the threshold value as the length of the time for placement increases in, for instance, a more complex placement scenario. Dynamically relaxing the threshold may provide a lower-fidelity solution, but it also may provide one that may be obtained more rapidly. As may be contemplated, these methods of determining and/or adjusting the threshold are merely illustrative examples and other methods of determining and/or adjusting the threshold may be considered as within the scope of the present disclosure.

In some embodiments, the placer may impose artificial constraints on the solution by adding phantom capacity requests of zero area to a legal region and placing strong constraints between those phantom capacity requests and one or more capacity requests in that legal region. In some embodiments, this adding of phantom capacity requests (or pinning of request) may help to constrain the solution by removing degrees of freedom. As may be contemplated, a phantom capacity request may have a strong constraint between itself and one or more capacity requests. As may be contemplated, strong constraints may make it very difficult to move a capacity request to another location as the map is solved. For example, the placer may determine that a certain set of machines is oscillating between two legal regions at each iteration and so, in order to at least partially constrain the solution, may elect to pin the set of machines to one or the other of the legal regions by placing a phantom capacity request. In another example, the placer may determine that a certain set of machines is best suited to a certain legal region because of machine capabilities, system needs, customer type, business value or a combination of these and/or other such reasons and may similarly pin that set of machines to a certain legal region with a phantom capacity request. In some embodiments, a strong constraint between a phantom capacity request and one or more capacity requests may not necessarily prevent the one or more capacity requests from being moved but may make it difficult to move the one or more capacity requests due to a high penalty imposed by such a move. As may be contemplated, in some embodiments where the threshold value may be relaxed due to changes in the system as described herein, a pinned capacity request that had been immovable may become moveable within the relaxed threshold.

After the placer has reached an acceptable solution, the placer may invoke a local placer to assign virtual machines associated with each of the capacity requests to physical machines associated with each of the available capacities of the legal regions in accordance with at least a portion of the iteratively produced legalized solved placement map. The solution may be acceptable according to an objective function evaluation that may measure the total of all of the constraints that may be violated in a particular proposed solution. The objective function may evaluate the constraints by, for example, applying force penalties to the constraints and summing up those penalties. In some embodiments, the objective function may take a first measure when the placement map is legalized and may take a second measure when the placement map is solved and may compare the difference in the two measures to a threshold value as described herein and in accordance with at least one embodiment.

FIG. 1 illustrates an environment 100 for placing guest virtual machines on distributed, virtualized and/or datacenter computer system environments as well as the associated code running thereon in accordance with at least one embodiment. A guest virtual machine 102 initiates a process of instantiation on a host machine that may be one of a plurality of host machines 108 operating in the environment 100. The guest virtual machine may be one of a plurality of guest virtual machines ready for instantiation on the host machine as a result of requests from customers, or from other computer systems, or a result of automated processes running on this or other computer systems or for other such reasons. In some embodiments, prior to being placed, a computer system may determine which host machine of the one or more host machines to place the guest virtual machine on, under the control of one or more processes operating on the computer system and/or on a different computer system. For example, in some embodiments the computer system may consist of one or more host machines with controlling domains such as hypervisors that manage and control the guest virtual machines operating on that host machine and the host machines may also, in some embodiments, have one or more placer processes that control the placement of guest virtual machines. In some embodiments, the placer process or processes may be separate from the controlling domain. In some embodiments, the placer process or processes may be connected to the controlling domain. In some embodiments, the placer process or processes may run on a subset of the host machines. In some embodiments, the placer process or processes may run on one or more separate computer systems. As may be contemplated, in some embodiments placer processes and controlling domains such as hypervisors may work together in a cooperative manner to manage and control the placement and operation of guest virtual machines using these and/or other such techniques.

In some embodiments, the placement operation 104 may occur quickly in comparison to the instantiation 106 on the host machine, allowing the system to proceed with instantiation of the guest virtual machine in the location determined by the placement operation in a timely and efficient manner. In some embodiments, the placement decision may be more complex and the placement 112 of a guest virtual machine 110 on a host machine that is one of a plurality of host virtual machines 116 may take a much longer time in comparison to the instantiation 114 on the host machine, thus producing a longer delay between the initiation of an instantiation operation for a guest virtual machine and the actual instantiation on the host machine. As may be envisioned, the placement operation may become more complex and may take more time when there are more guest virtual machines to place, or when those guest virtual machines have a complex structure, or when those guest virtual machines have high resource demands, or when there are a large number of hosts on the system, or when those hosts are crowded and heavily utilized, or when customer or system requirements may dictate grouping of different hosts together or due to a combination of these and/or other such factors.

Figure 2:
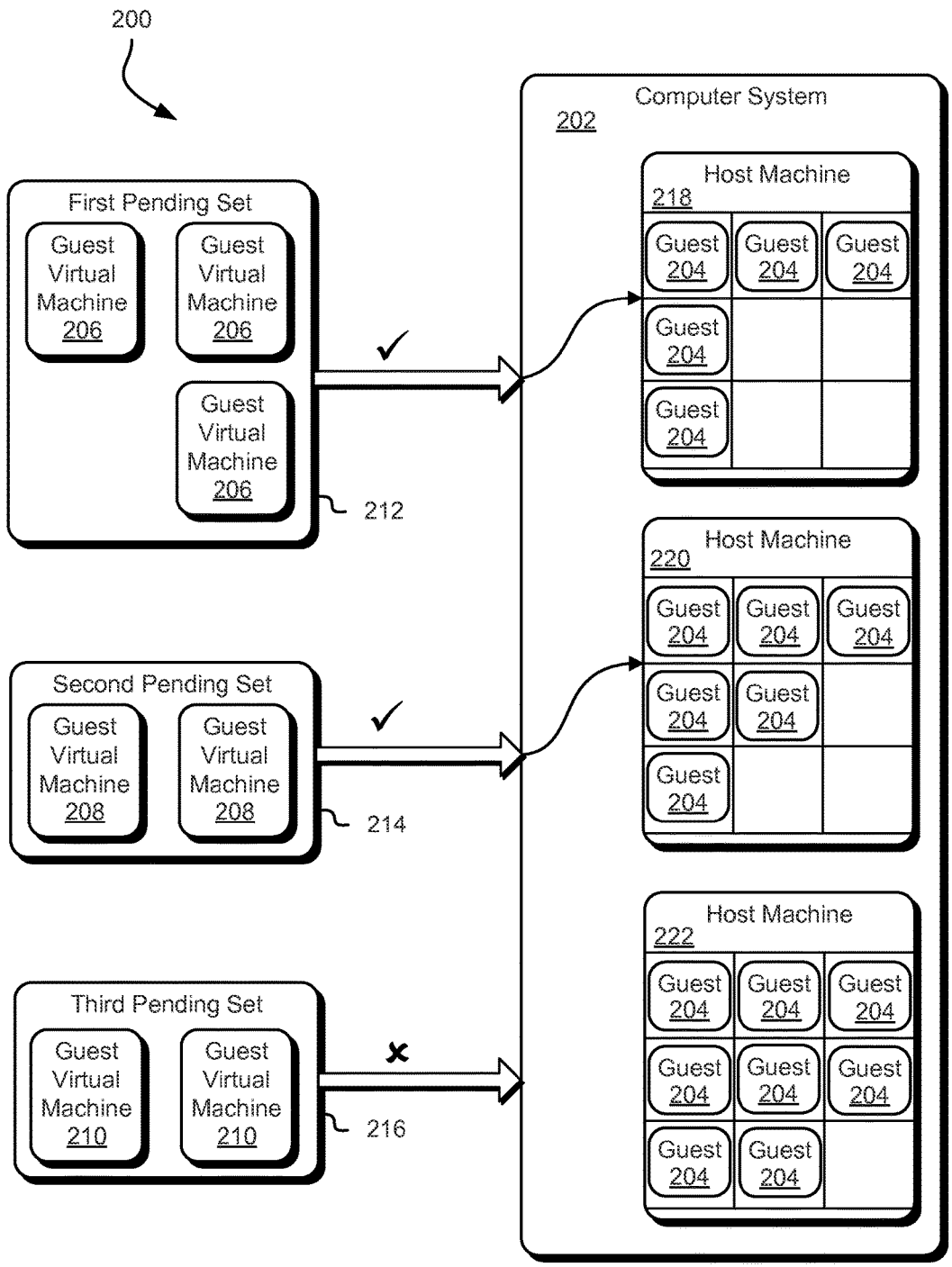
FIG. 2 illustrates an example environment where guest virtual machines may be located for instantiation in a distributed and/or virtual computer system environment in accordance with at least one embodiment.

FIG. 2 illustrates an example environment 200 where one or more sets of guest virtual machines may be placed and instantiated on one or more host machines on a distributed, virtualized and/or datacenter computing environment as described at least in connection with FIG. 1 and in accordance with at least one embodiment. A computer system may contain one or more host machines as described herein at least in connection with FIG. 1 and in accordance with at least one embodiment. Each of the host computer systems may have one or more guests or guest virtual machines running thereon or may, in some embodiments, have no guests or guest virtual machines running thereon. The guests on each of the host machines may have been previously placed and instantiated by a placer process as described herein and at least in connection with FIG. 1 and in accordance with at least one embodiment. In some embodiments, the computer system may have one or more pending sets of guest virtual machines that may be ready to be placed and instantiated on the host machines. Each pending set of guest virtual machines may contain one or more guest virtual machines of one or more types that may be ready for placement and instantiation, and may also contain one or more constraints that may at least partially restrict how and/or where the pending guest virtual machines may be placed. As may be contemplated, constraints on how and/or where pending sets of guest virtual machines may be placed may include, but not be limited to, constraints between individual machines, constraints between individual machines in a subset of guest virtual machines, constraints between individual guest machines and subsets of guest virtual machines, constraints between subsets of guest virtual machines or a combination of these and/or other such constraints.

FIG. 2 illustrates an example environment wherein a computer system 202 has host machines 218, 220 and 222 which may be three of a plurality of host machines running on computer system 202. Each host machine may contain one or more previously placed and instantiated 204 guests or guest virtual machines as described herein at least in connection with FIG. 1 and in accordance with at least one embodiment. In some embodiments, each host machine might not contain any previously placed and instantiated guest virtual machines as described herein at least in connection with FIG. 1 and in accordance with at least one embodiment. In FIG. 2, a first pending set 212 of three guest virtual machines 206 wherein the pending set also may contain a constraint that all three machines must be placed on the same host machine, may be placed and instantiated on a host machine 218 as described herein at least in connection with FIG. 1 and in accordance with at least one embodiment. Host machine 218 may, in this example, have capacity for four guest virtual machines before placement of the first pending set and may have capacity for one guest virtual machine after placement of the first pending set. A second pending set 214 of two guest virtual machines 208 wherein the pending set may also contain a constraint that both guest virtual machines must be placed on the same host machine, may be placed and instantiated on a host machine 220 as described herein at least in connection with FIG. 1 and in accordance with at least one embodiment. Host machine 220 may, in this example, have capacity for three guest virtual machines before placement of the second pending set and may have capacity for one guest virtual machine after placement of the second pending set. In the example illustrated in FIG. 2, a third pending set 216 of two guest virtual machines 210 wherein the pending set may also contain a constraint that both guest virtual machines must be placed on the same host machine, may not be placed on any of the host machines 218, 220 or 220 in computer system 202 because none of the example guest virtual machines has available capacity for two guest virtual machines.

Figure 3:
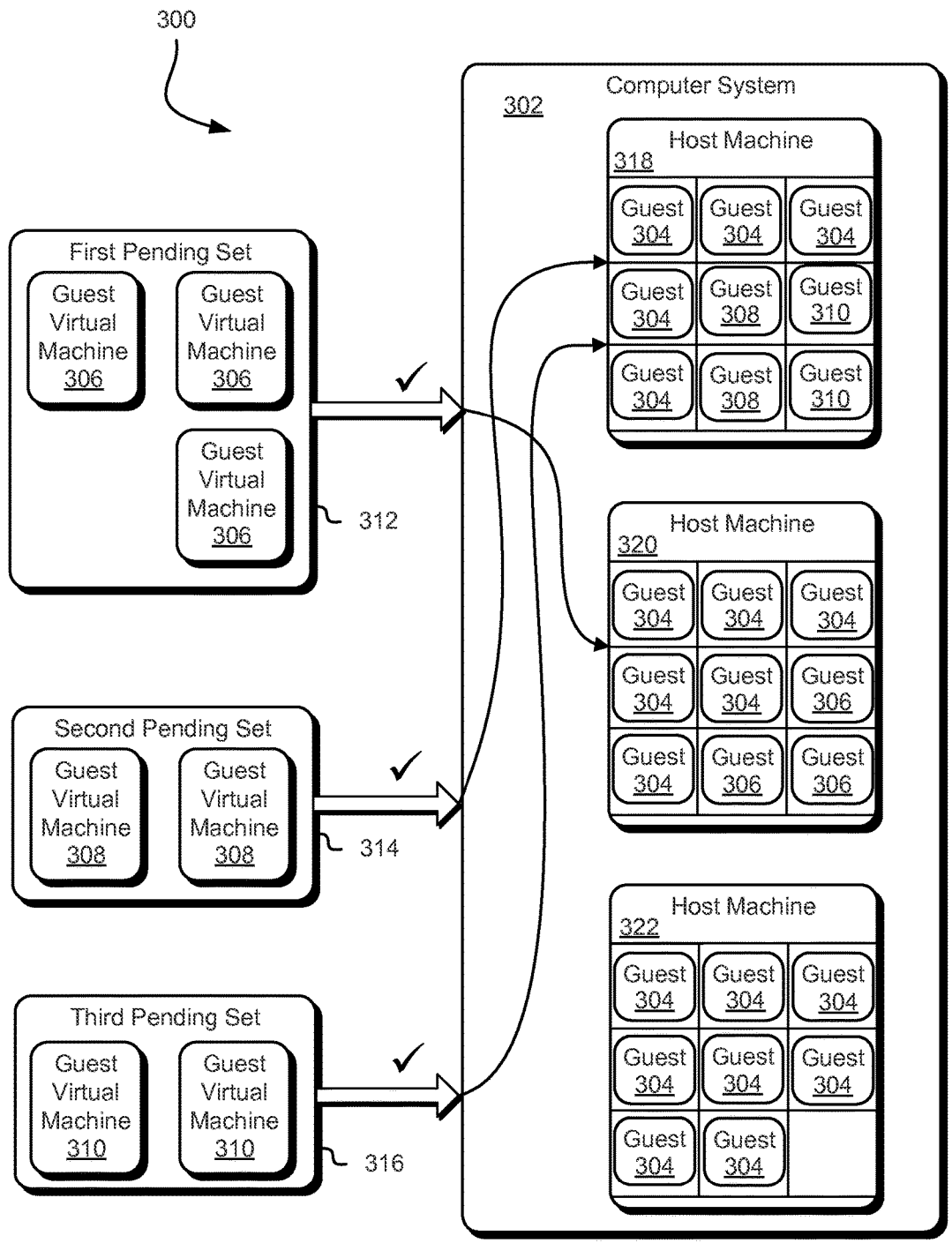
FIG. 3 illustrates an example environment where sets of guest virtual machines may be placed in a computer system in accordance with at least one embodiment.

FIG. 3 illustrates an example environment 300 where one or more sets of guest virtual machines may be placed and instantiated on one or more host machines on a distributed, virtualized and/or datacenter computing environment as described at least in connection with FIG. 1 and in accordance with at least one embodiment. FIG. 3 illustrates an alternate method of placement of guest virtual machines than the method that was illustrated in FIG. 2. A computer system 302 has host machines 318, 320 and 322 which may be three of a plurality of host machines running on computer system 302 described at least in connection with FIGS. 1 and 2 and in accordance with at least one embodiment. Each host machine may contain one or more previously placed and instantiated 304 guests or guest virtual machines. As described at least in connection with FIG. 2, in some embodiments, each host machine might not contain any previously placed and instantiated guest virtual machines. In FIG. 3, a first pending set 312 of three guest virtual machines 306 may be placed and instantiated on a host machine 320. As described at least in connection with FIG. 2, the pending set of guest virtual machines may also contain one or more constraints as to how the guest virtual machines may be placed on the host machines. For example, the first pending set 312 may include one or more constraints to ensure that the three guest virtual machines 306 are all instantiated on the same host machine. Host machine 320 may, in this example, have capacity for three guest virtual machines before placement of the first pending set and may have no capacity for any more guest virtual machines after placement of the first pending set. A second pending set 314 of two guest virtual machines 308 wherein the pending set may also contain a constraint that both guest virtual machines must be placed on the same host machine, may be placed and instantiated on a host machine 318. Host machine 318 may, in this example, have capacity for four guest virtual machines before placement of the second pending set and may have capacity for two guest virtual machines after placement of the second pending set. In the example illustrated in FIG. 2, the third pending set 216 of two guest virtual machines 210 was not placeable on any of the host machines in computer system 202 because none of the example guest virtual machines had available capacity for two guest virtual machines. In the example illustrated in FIG. 3, the third pending set 316 of two guest virtual machines 310 wherein the pending set may also contain a constraint that both guest virtual machines must be placed on the same host machine, may be placed and instantiated on a host machine 318. Host machine 318 may, in this example, have capacity for two guest virtual machines before placement of the third pending set because of the two guest virtual machines placed by the second pending set and may have no capacity for any more guest virtual machines after placement of the third pending set.

Figure 4:
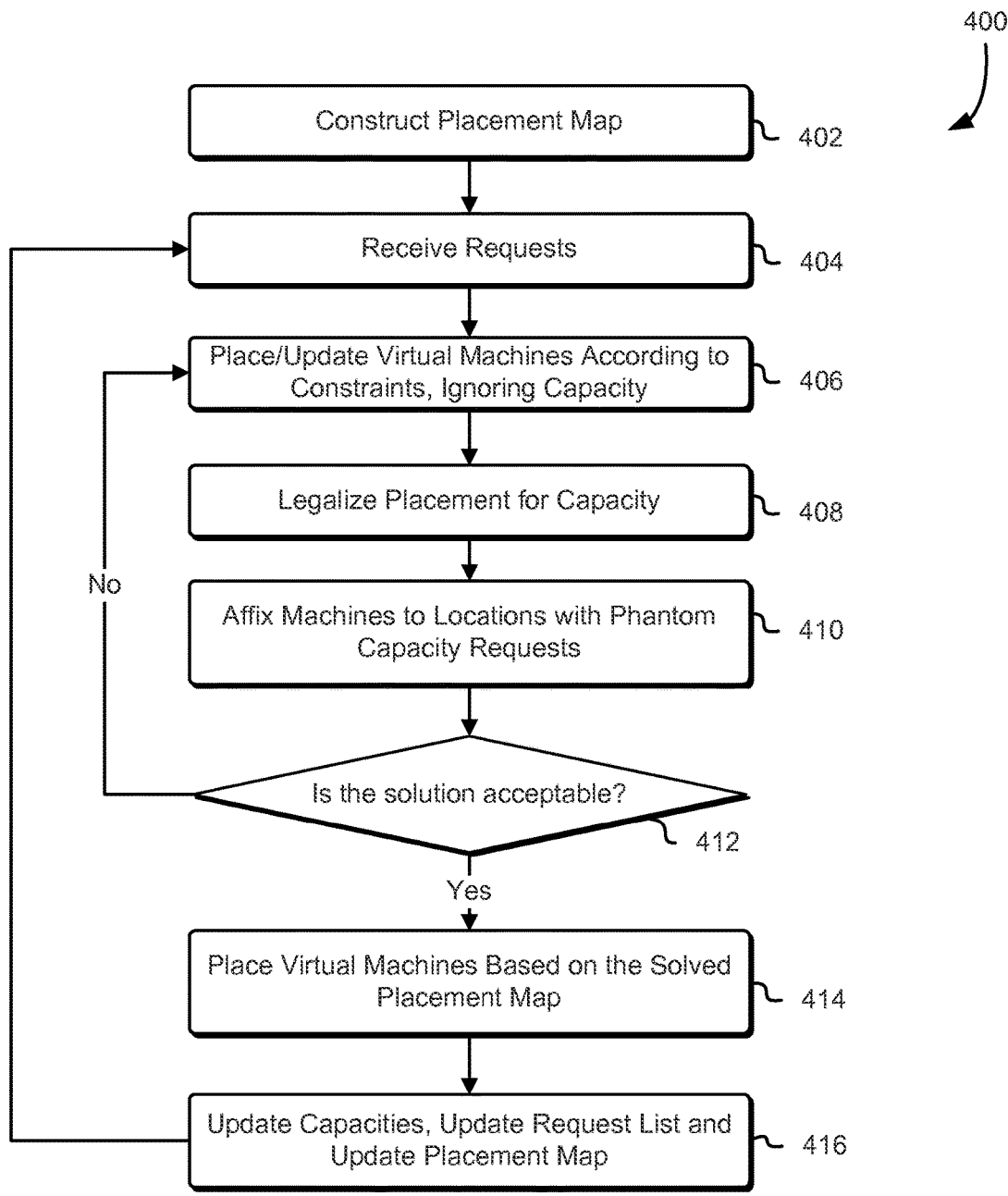
FIG. 4 illustrates an example process for constructing a placement map and iteratively solving that placement map in accordance with at least one embodiment.

FIG. 4 illustrates an example process 400 for constructing a placement map, iteratively solving and legalizing the placement map, placing guest virtual machines according to the solved and legalized placement map and for updating the placement map based on the newly placed guest virtual machines as described at least in connection with FIG. 1 and in accordance with at least one embodiment. In some embodiments a placer process such as the placer process described herein at least in connection with FIG. 1 may perform at least a portion of process 400. A placer process or processes may 402 construct a placement map that may represent the available capacity of the host machines of a computer system. The placement map may be constructed based on available capacity data sent from a controlling domain such as a hypervisor running on each of the host machines of a computer system. In some embodiments, a placer process or processes may query each of the host machines, or may maintain a table of available capacities, or a process or processes on each of the host machines that is at least configured to report available capacity may report available capacity data to the placer process or processes or the placer process may receive the available capacity data from a combination of these and/or other such processes.

In some embodiments, the placement map may be constructed such that areas of legal regions of the placement map correspond to available capacity of the host machines that are within each legal region. As may be contemplated, the available capacity of the host machines that are within a legal region may be based on number of virtual machine slots on the host machines, or available memory, CPU cycles and/or other such resources on the host machines or other such measures of available capacity. In some embodiments, the placement map may be constructed such that distances between areas of legal regions of the placement map correspond to one or more measurements of intercommunication between legal regions. For example, in some embodiments, the placement map may be constructed such that distances between areas of legal regions of the placement map correspond to communication latencies between host machines in each of the legal regions. As may be contemplated, the distance measurement may correspond to a maximum latency between pairs of machines in each of the legal regions, or may correspond to an average latency between pairs of machines in each of the legal regions, or may correspond to a minimum latency between pairs of machines in each of the legal regions or may correspond to some other such measurement of latency between pairs of machines in each of the legal regions. In some embodiments, the placement map may be constructed such that distances between areas of legal regions of the placement map correspond to other communications measures between host machines in each of the legal regions including, but not limited to, communication bandwidth between pairs of machines in each of the legal regions, or type of network communication between pairs of machines in each of the legal regions or other such communications measures.

After having constructed a placement map, the placer may begin 404 to retrieve one or more capacity requests from the ready list of capacity requests. The capacity requests may come from a data structure such as a queue, list, map, hash or other such data structure such that areas of the capacity requests correspond to the required capacity of virtual machines for placement and assigned forces or constraints correspond to connective requirements between each of the respected required capacities. The capacity requests may come from the ready list as lists of requirements that may be translated such that capacity requests correspond to the required capacity of virtual machines for placement and assigned forces or constraints correspond to connective requirements between each of the respected required capacities. The placer may retrieve requests one at a time, or in groups or in a combination of individually and in groups. In some embodiments, the placer may select and organize requests according to one or more methods such as methods to group similar requests together, methods to group requests for a certain resource together, methods to group requests from certain requesters or types of requesters together, methods to lower or increase the priority of certain requests or combinations of these and/or other such methods. In some embodiments, the placer may choose to return one or more requests from the set of requests retrieved back to the ready list for later processing. For example, in some embodiments where the ready list is embodied as a queue, the placer may return requests to the top of the queue, or to the bottom of the queue or to some other location within the queue. The placer may choose whether to return one or more requests and may determine where in the queue to return the one or more requests based on a variety of factors including, but not limited to, availability of resources, type of request, type or nature of the requester, and/or other such factors.

After having retrieved one or more placement requests the placer may begin a process of iteratively solving and legalizing the placement map by first placing 406 the one or more capacity requests in the placement map such that constraints on the placement of the capacity requests are satisfied such as, for example, minimizing the force penalties between the placement capacities. The initial placement may solve the initial placement map by placing the capacity requests on the placement map without regard to available capacities in the legal regions. In such an initial solution the placement capacities may be placed in the placement map in such a manner that the capacity of one or more of the legal regions may be exceeded. Such a placement map may be considered to be solved or optimal with respect to constraints between placements, but may be considered to be illegal with respect to constraints on capacity of legal regions. As may be contemplated, in some embodiments the placer may initially place all related capacity requests in the same legal region such that distance between them, and thus the constraint force, is minimized. For example, a capacity request for ten virtual machines with a constraint that the first five virtual machines must be within two network hops of the other five virtual machines may be satisfied by placing all ten virtual machines in the same legal region, even if that legal region may only support six of those virtual machines.

After having placed the one or more capacity requests in the placement map such that the map may be considered solved but may also be considered illegal, the placer may 408 begin legalizing the placement map by redistributing capacity requests from one or more legal regions where the capacity may be exceeded, to one or more legal regions with available capacity. The placer may begin legalizing the placement map by at least relaxing one or more of the constraints between the capacity requests to allow the redistributing of capacity requests to different regions. As may be contemplated, a variety of methods and techniques may be used to redistribute capacity requests from oversubscribed legal regions to regions with available capacity. The method or technique chosen may depend on a variety of factors including the size of the placement map and/or the related system, the number or complexity of the capacity requests, the degree of optimization desired or a combination of these and/or other such similar factors.

In some embodiments, the capacity requests in the placement map may be redistributed using a metaheuristic optimization technique such as, for example, a genetic algorithm, a simulated annealing algorithm or other such metaheuristic optimization technique. The metaheuristic optimization technique may be used to redistribute the capacity requests by allowing some or all of the constraints and/or relaxed constraints to be violated in order to increase placement legality. Alterations to the map that improve the legality and still satisfy at least some of the constraints and/or relaxed constraints may be retained while alterations to the map that do not improve the legality and/or greatly violate the constraints may be discarded. As may be contemplated, in some embodiments, other non-heuristic iterative methods with or without guaranteed or predicted global convergence may be used to redistribute capacity requests in the placement map. Such iterative methods include, but are not limited to, Newton's and quasi-Newton methods, gradient descents, conjugate gradient methods and other such methods. As with the metaheuristic optimization techniques, the choice of non-heuristic method or technique may depend on a variety of factors including the size of the placement map and/or the related system, the number or complexity of the capacity requests, the degree of optimization desired or a combination of these and/or other such similar factors.

In some embodiments, the placer may add additional constraints to the placement map during the process of solving and legalizing the placement map in order to ensure certain configurations. One method of ensuring certain configurations is for the placer to 410 affix machines to legal regions with phantom machine capacity requests or constraints. In such embodiments, the placer may create and place new capacity requests with zero area, but with very strong constraints or penalty forces between the new capacity requests and one or more other capacity requests. As may be contemplated, satisfying the strong constraints of such requests may tend to keep certain capacity requests in certain legal regions while the zero area of the phantom capacity requests keeps them from adversely affecting the legality of the placement map. In an illustrative example, consider a capacity request for four guest virtual machines that, according to system policy, resource needs, the nature of the guest virtual machines, the nature of the requester or other such factors, may be best served by being instantiated in a certain legal region. By placing a phantom capacity request of zero area in that legal region with a very strong constraint between the phantom capacity request and the capacity request for the four guest virtual machines, the various redistribution techniques will tend to redistribute the four guest virtual machines to the desired legal region. As may be contemplated, the placer may choose to add and/or remove phantom capacity requests for a variety of reasons and because of a variety of system factors including, but not limited to, affinity locations for capacity requests, the nature of the capacity requests, the nature of the requester, resource needs or a combination of these and/or other such reasons. As also may be contemplated, the placer may choose to add and/or remove phantom capacity requests to improve and/or optimize the accuracy and/or performance of the one or more redistribution algorithms. For example, if at each iteration, the placer determines that a redistribution algorithm is swapping one or more capacity requests to a different legal region in an oscillating manner, the placer may set phantom capacity requests with strong constraints to one or more of the oscillating capacity requests in order to restrict or eliminate such behavior.

At each iteration, the placer may produce solved, but potentially illegal placement maps and then may attempt to legalize those maps while retaining a valid solution. If the placer determines that the solution is either not legal or is not sufficiently valid, the placer may attempt to solve the placement map again by 406 attempting to solve the placement map according to strong emphasis on constraints with at least a weaker emphasis on legality. As may be contemplated, the placer may alter and/or adjust the emphases on constraints and on legality at each iteration of the placement step. For example, the placer may initially place the capacity requests according to a strong emphasis on constraints but with no emphasis on legality but may, on subsequent iterations weaken the emphasis on constraints while increasing the emphasis on legality. As may be contemplated, the placer may also use phantom capacity request constraints as described above to adjust the weighting of emphasis on constraints and legality in each iteration.

When the placer determines 412 that the solution is both legal and sufficiently valid, the placer may 414 invoke a local placer such as a hypervisor to assign guest virtual machines associated with each of the capacity requests to host machines associated with each of the available capacities in accordance with at least a portion of the iteratively produced legalized and solved placement map. In some embodiments, the placer may determine that the solution is both legal and sufficiently valid by calculating a difference between the force penalties of the constraints of the solved placement map produced in step 406 and the force penalties of the constraints of the legalized placement map produced in step 408 and then by comparing that difference between those force penalties to a threshold value. As may be contemplated, a relaxed threshold value may produce placements that are legal, that may at least violate some of the constraints and that may converge quickly while a tight threshold value may produce placements that are legal, that violate fewer constraints but that may converge slowly. Once machines are placed by a local placer, the placer may 416 retrieve updated available capacities from the legal placement regions, update the placement map and update the ready requests. If and/or when there are more remaining placement requests the placer may then 404 retrieve the next set of placement requests.

Figure 5:
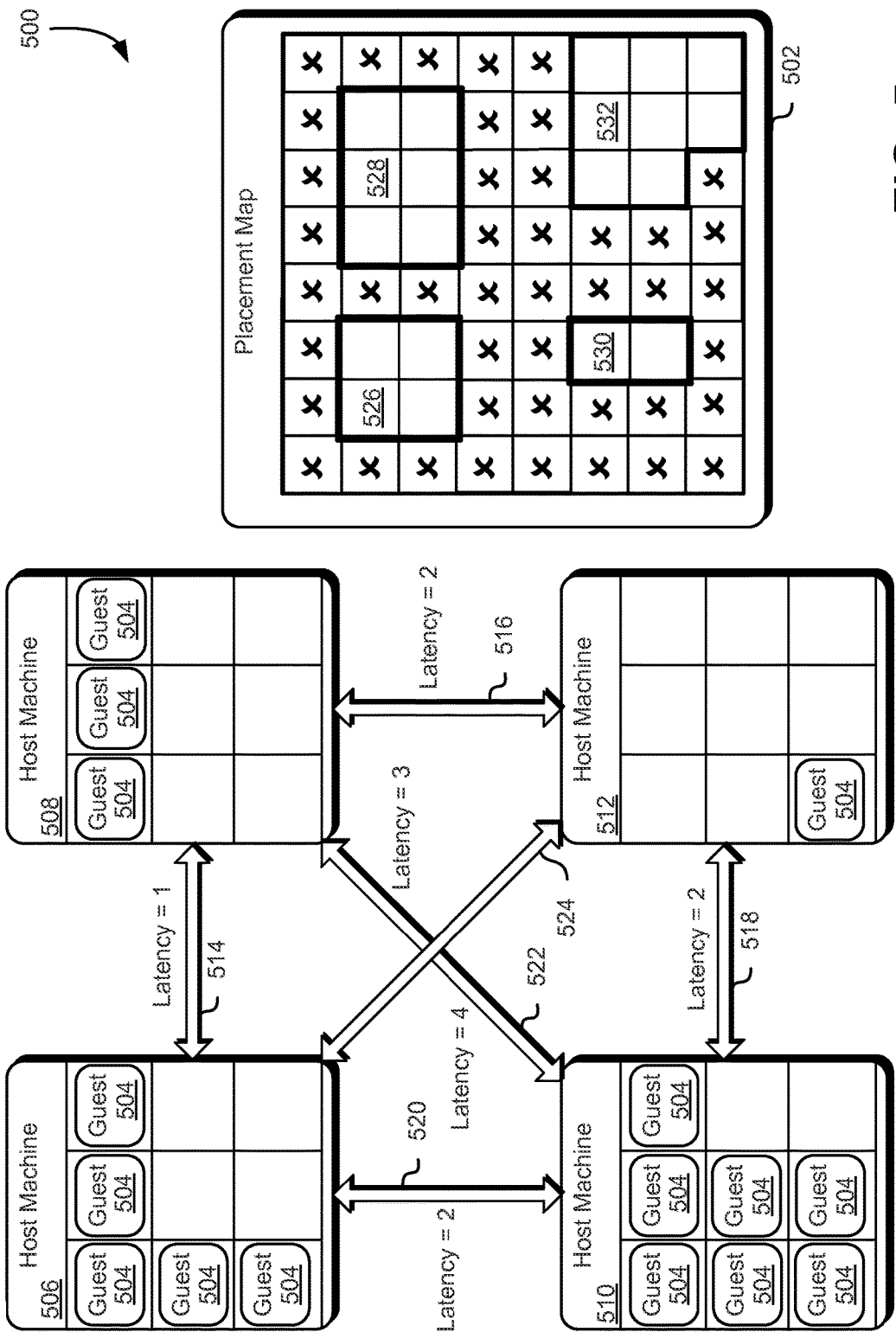
FIG. 5 illustrates an example environment where a placement map that represents available capacity in a computer system may be constructed in accordance with at least one embodiment.

FIG. 5 illustrates an example environment 500 where a placement map that may represent the available capacity of one or more host machines in a distributed, virtual and/or datacenter computer system may be constructed as described herein at least in connection with FIGS. 1 and 4 and in accordance with at least one embodiment. A host machine 506 in a legal region may have one or more currently running guests or guest virtual machines 504 and may have an available capacity for four guest virtual machines. An available capacity area 526 representing the four machine available capacity may be added to placement map 502. As may be contemplated, the grid in placement map 502 is an illustrative example placement map wherein the open squares represent capacity for single machines and the squares that are crossed out represent both available capacities that are occupied by running guest machines as well as the latency values between host machines. As discussed herein, other methods of representing the placement map may be considered as within the scope of the present disclosure.

A host machine 508 in a legal region may have an available capacity for six virtual machines which may be represented in the placement map as available capacity area 528. Because the latency 514 between host machine 506 and host machine 508 is one, available capacity area 526 and available capacity area 528 may be placed close to one another in the placement map. As may be contemplated, the latency numbers shown in FIG. 5 are illustrative and represent relative values rather than the one or more communications latency values described herein at least in connection with FIG. 1. A host machine 510 in a legal region may have available capacity for two guest virtual machines which may be represented in the placement map as available capacity area 530. Because the latency 520 between host machine 510 and host machine 506 is two, available capacity area 530 and available capacity area 525 may be placed further apart than available capacity area 526 and available capacity area 528. Similarly, because the latency 522 between host machine 508 and host machine 510 is three, available capacity area 528 and available capacity area 530 may be further apart than the distance between available capacity area 530 and available capacity area 525. Finally, host machine 512 in a legal region may have available capacity for eight guest virtual machines which may be represented in the placement map as available capacity area 532. The latencies 516, 518 and 524 are represented by the distances between available capacity area 532 and available capacity area 528, available capacity area 530 and available capacity area 526 respectively.

Figure 6:
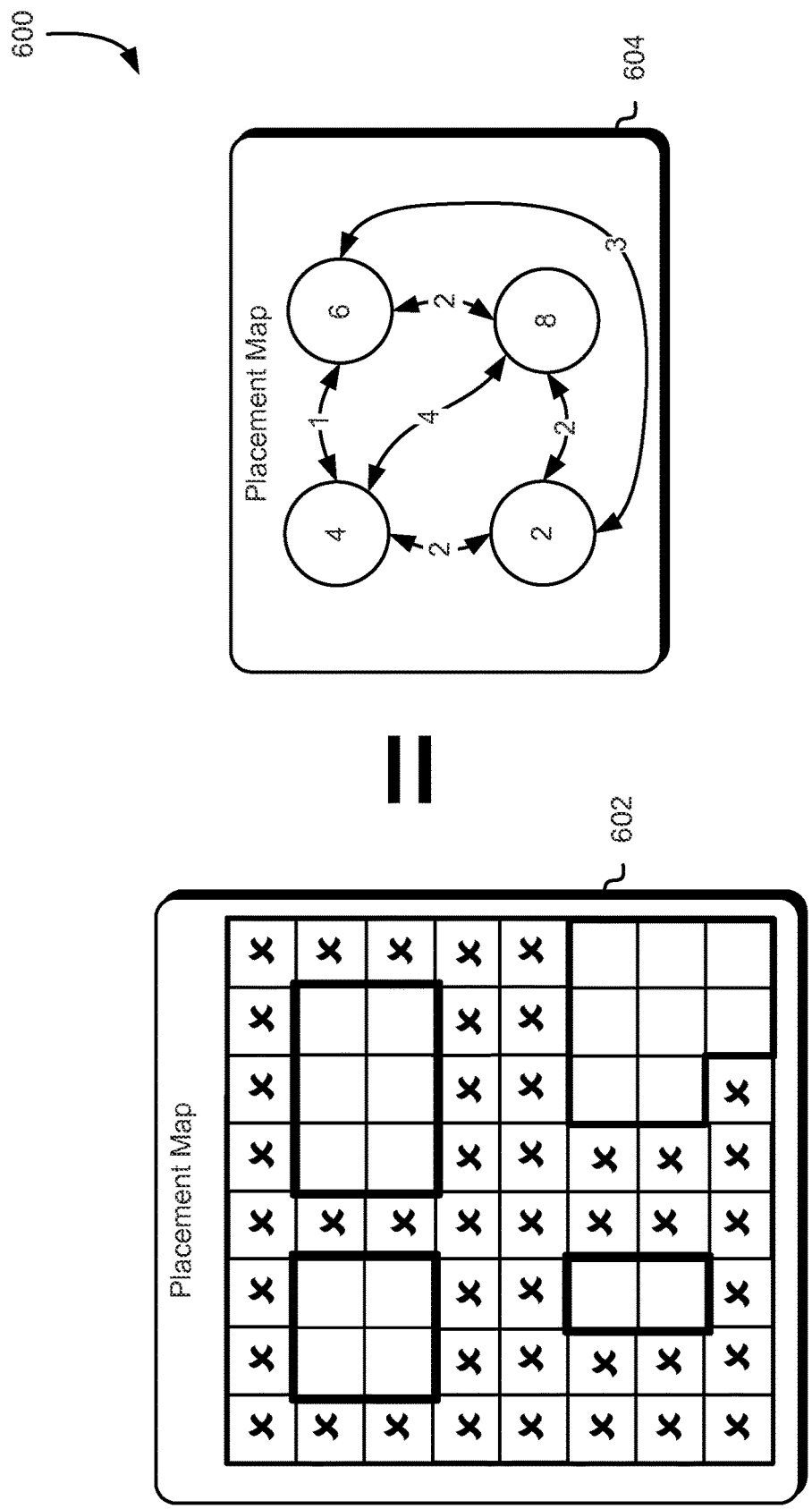
FIG. 6 illustrates an example environment where an alternative representation of a placement map may be constructed in accordance with at least one embodiment.

FIG. 6 illustrates an example environment 600 where an alternative representation of a placement map as described herein at least in connection with FIG. 5 and in accordance with at least one embodiment, is illustrated. As may be contemplated, it may be convenient to use a variety of techniques to represent both the available capacities and their respective latencies in a placement map. For example, in the placement map 502 in FIG. 5, distances, and thus latencies, may be measured with a grid-based, Manhattan or taxicab distance rather than a Cartesian distance. In such embodiments, a taxicab distance may be used to yield a more accurate placement result. The placement map 604 in FIG. 6 may represent the same system as the placement map 602, which is the same as placement map 502 in FIG. 5, but with the available capacities shown as nodes on a graph and the latencies shown as edge weighting. This or other representations of the placement map may be chosen as the type, complexity, architecture and/or other such factors of the system dictate. For example, in more complex systems it may be useful to represent the placement map as three-dimensional system, or as a map of maps, or as a collection of maps or as a number of other such techniques as may be appropriate to best illustrate the legal region capacities. Other methods of representing the map, or of representing the available capacities, or of representing the distances between them may be considered as within the scope of the present disclosure. As may be contemplated, the map may be distorted during processing to reflect changes in system conditions during placement. For example, an initial map may be created that corresponds to latency measurements between the legal regions, but the map may then be distorted based on dynamic changes in those latency measurements as the system processes the placement requests, leading to possible changes in acceptable solutions.

Figure 7:
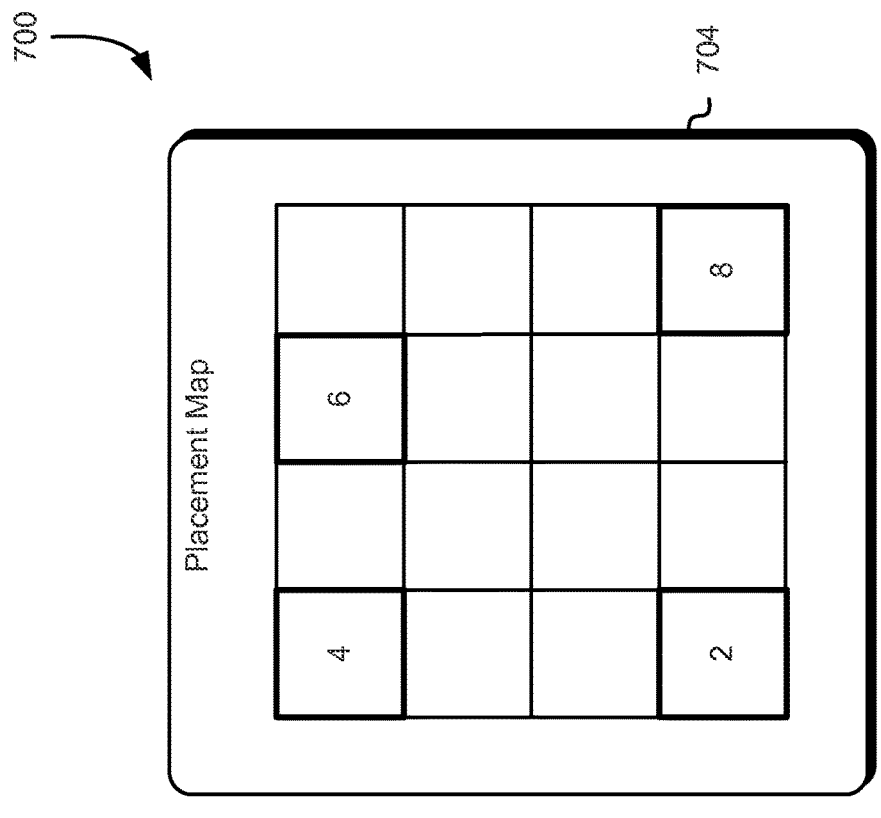
FIG. 7 illustrates an example environment where an alternative representation of a placement map may be constructed in accordance with at least one embodiment.
Figure 7:
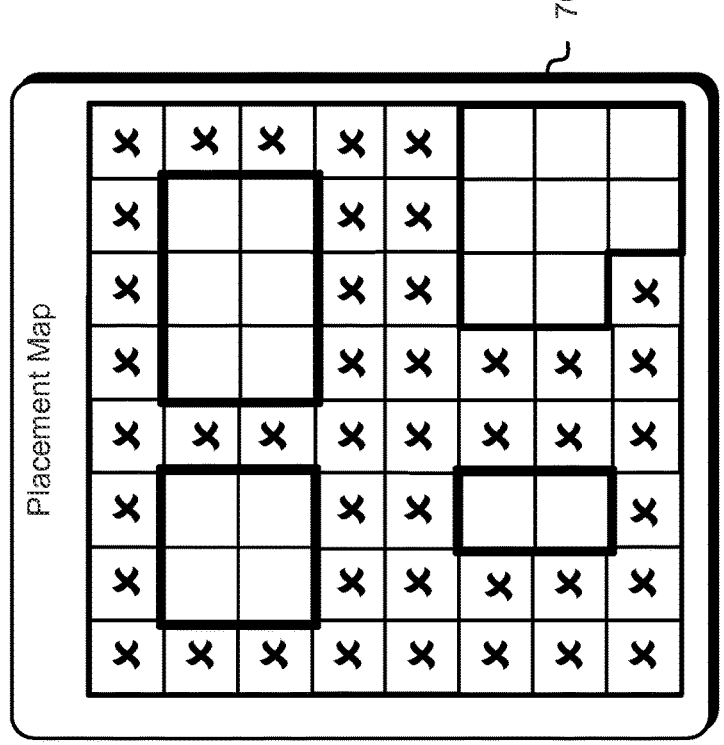

FIG. 7 illustrates an example environment 700 where an alternative representation of a placement map as described herein at least in connection with FIG. 5 and in accordance with at least one embodiment, is illustrated. As may be contemplated, it may be convenient to use a variety of techniques to represent the available capacities in a placement map. For example, in the placement map 502 in FIG. 5 each empty square may represent available capacity in a legal region for a single machine. The placement map 704 in FIG. 7 may represent the same system as the placement map 702, which is the same as placement map 502 in FIG. 5, but with the available capacities in each legal region represented as a single square with one or more numbers which may represent the available capacity for the legal region. In the placement map 704, the distances may still represent latencies or, in some embodiments, may represent one or more other quantities upon which the system may base constraints between the capacity requests.

As may be contemplated, a square in a placement map such as placement map 704, with an available capacity of, for example, eight machines, may have a legal placement if the up to eight machines are placed in that square by the placer, and may have an illegal placement if more than eight machines are placed in that square by the placer. In some embodiments, aggregating capacities in a placement map such as is illustrated in FIG. 7 may allow a placement algorithm to delegate the assignment of individual machines to a local placer on a host machine which may be more efficient. Similarly, in some embodiments, aggregating capacity in this way may make the placement algorithm more efficient by deferring resolving details until after a high level plan has completed. As may be contemplated, in some embodiments, aggregation of machines and generation of a placement map may be done by the host machine, server rack or other such logical grouping.

Figure 8:
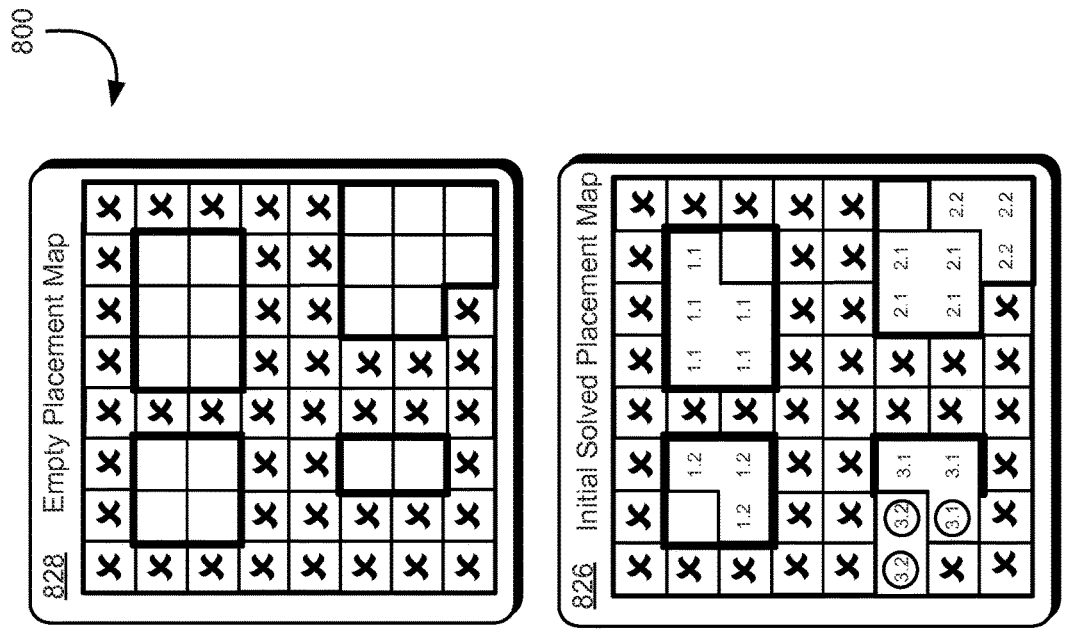
FIG. 8 illustrates an example environment where available capacity requests are initially placed on a placement map in accordance with at least one embodiment.
Figure 8:
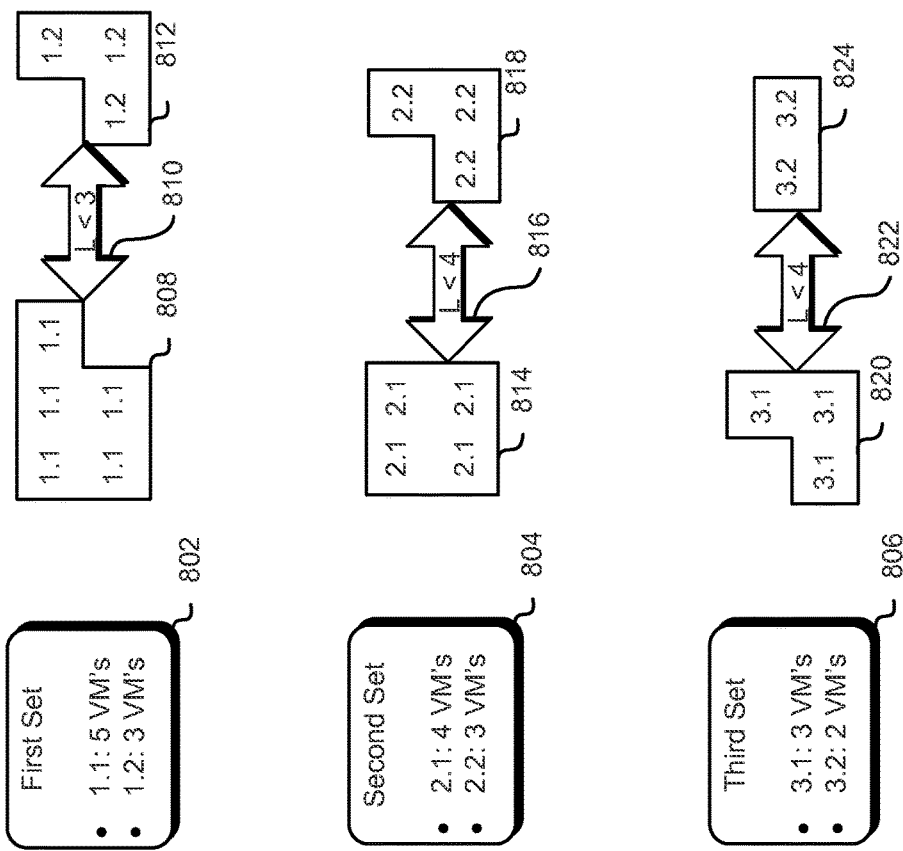

FIG. 8 illustrates an example environment 800 where one or more sets of available capacity requests may be placed in a placement map in preparation for solving and legalizing the placement map as described at least in connection with FIG. 4 and in accordance with at least one embodiment. Starting with an empty placement map 828 which is equivalent to placement map 502 in FIG. 5, three sets of machine capacity requests may be retrieved from a list of capacity requests as described at least in connection with FIG. 4 and in accordance with at least one embodiment.

The first set 802 of machine capacity requests may include a first subset of capacity requests 808 which, in this example, represents a request for a set of five guest virtual machines that are constrained to run on the same virtual machine as one another. The first set 802 of machine capacity requests may also include a second subset of capacity requests 812 which, in this example, represents a request for a set of three guest virtual machines that are also constrained to run on the same virtual machine as one another. The first set 802 of machine capacity requests may also include a further constraint 810 which constrains the two subsets of guest virtual machines to run on legal regions with a latency of less than three between the legal regions.

The second set 804 of machine capacity requests may include a first subset of capacity requests 814 which, in this example, represents a request for a set of four guest virtual machines that are constrained to run on the same virtual machine as one another. The second set 804 of machine capacity requests may also include a second subset of capacity requests 818 which, in this example, represents a request for a set of three guest virtual machines that are also constrained to run on the same virtual machine as one another. The second set 804 of machine capacity requests may also include a further constraint 816 which constrains the two subsets of guest virtual machines to run on legal regions with a latency of less than four between the legal regions.

The third set 806 of machine capacity requests may include a first subset of capacity requests 820 which, in this example, represents a request for a set of three guest virtual machines that are constrained to run on the same virtual machine as one another. The third set 806 of machine capacity requests may also include a second subset of capacity requests 824 which, in this example, represents a request for a set of two guest virtual machines that are also constrained to run on the same virtual machine as one another. The third set 806 of machine capacity requests may also include a further constraint 822 which constrains the two subsets of guest virtual machines to run on legal regions with a latency of less than four between the legal regions.

The 826 initial solved placement map shows an initial placement arrangement that places the capacity requests in the placement in such a way so that latency constraints may be satisfied, but legality of placements based on available capacity may ignored. In the initial solved placement map, capacity request 808 and capacity request 812 are placed in such a way that the available capacities are legal and the constraints are also satisfied. Capacity requests 808 and 812 are placed in legal regions with a latency of one between them, thus satisfying the constraint 810. Capacity request 814 and capacity request are also placed in such a way that available capacities are legal and the constraints are satisfied. Placing both capacity requests in the same legal region, with a presumed latency of zero, satisfies the latency constraint 816. Finally, capacity request 820 and capacity request 824, which together represent requests for five guest virtual machines are placed together in the same legal region, also satisfying the latency constraint 822, but because capacity request 820 and capacity request 824 are placed may have only enough room to hold two guest virtual machines, the legality of the placement may not be satisfied. In this example, the capacity requests which may result in illegal placement of machines are indicated with circles for illustrative purposes only. As may be contemplated, there are a number of other possible arrangements of the capacity requests on the placement map that may satisfy latency constraints but that may violate legality. For example, capacity request 824 may also have been placed in any of the other legal regions, all of which have a latency of three or less from the legal region that capacity request 820 was placed in.

Figure 9:
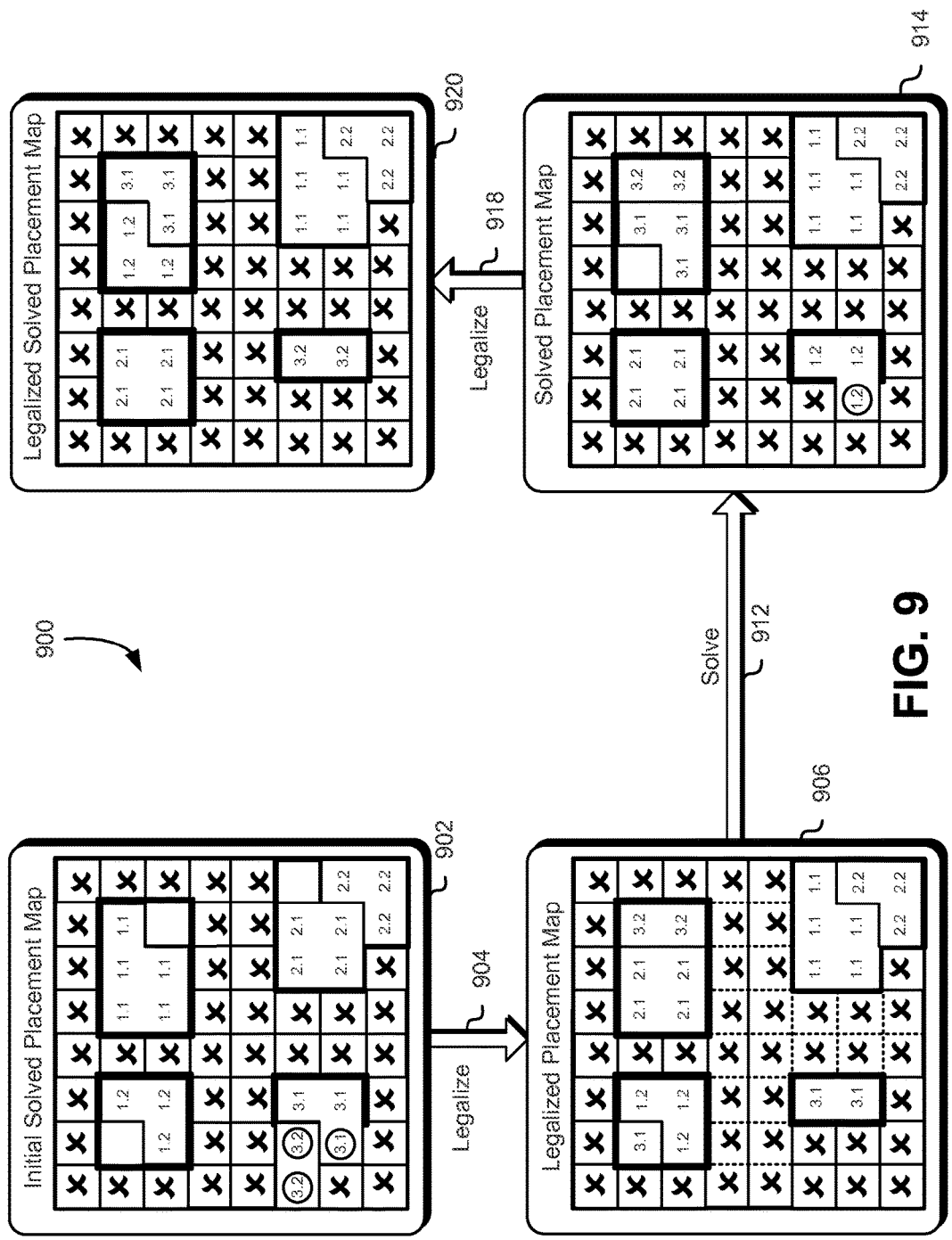
FIG. 9 illustrates an example environment where a placement map is iteratively solved to produce a placement solution in accordance with at least one embodiment.

FIG. 9 illustrates an example environment 900 where one or more iterations of solving and legalizing a placement map may be performed as described herein at least in connection with FIG. 4 and in accordance with at least one embodiment. The initial solved placement map 902 is the same initial solved placement map 826 from FIG. 8. As illustrated herein, the initial solved placement map 902 may be initially solved in such a manner as to satisfy the latency constraints between the capacity requests but in such a manner that may not satisfy the legality of available capacities. The initial solved placement map 902 may first be legalized 904 so that a legalized placement map 906 is produced. In legalizing the placement map, one or more capacity requests may have been moved to different legal regions so that the available capacities of those legal regions are not exceeded. However, in moving one or more capacity requests, latency constraints may now be violated. For example, the constraint 810 that the latency between the subset of capacity requests 808 and the subset of capacity requests 812 of the first set of capacity requests 802 as described in connection with FIG. 8, may be violated in legalized placement map 906 because the latency between these two subsets is four. This violation may have occurred as a result of moving capacity requests when 904 legalizing the map. Additionally, the constraint that 820 the first subset of the third set of capacity requests all run on the same machine as described in connection with FIG. 8 may also be violated by the legalization 904 because the three machines are not running in the same legal region. Both violations may be addressed in the next iteration of solving the map as described herein at least in connection with FIG. 8 and in accordance with at least one embodiment. As may be envisioned, one or more of the capacity requests may be pinned to regions with phantom capacity requests for one or more reasons as described herein at least in connection with FIG. 8 and in accordance with at least one embodiment. For example, because available capacity request 808 as described in connection with FIG. 8 has the largest number of requested virtual machines, the placer may determine that it is most efficient to place that available capacity request in the legal region with the largest available area and to keep that placer request in that legal region by pinning it there with a phantom capacity request.

The legalized placement map 906 that may contain one or more violated latency constraints may next be solved 912 as described herein at least in connection with FIG. 4 and in accordance with at least one embodiment. This solution may involve relaxing constraints between available capacity requests in order to at least facilitate a better solution. For example, the constraint 816 that the latency between capacity requests 814 and 818 as described in connection with FIG. 8 may be violated in solved placement map 914 because the constraint is that the latency between the two capacity requests be less than four while, as placed, the latency is four. However, this violation may be allowed as described herein at least in connection with FIG. 8 and in accordance with at least one embodiment in order to facilitate a rapid solution. As may be contemplated, the constraint that the latency between the two capacity requests may, in some embodiments, have a lesser penalty for violation than other constraints such as, for example, a constraint that all guest virtual machine in a certain subset of a capacity request run in the same legal region. In some embodiments, a constraint may be violable because it may be desired behavior only, or because of the nature of the machines in the capacity request, or because the nature of the applications running on those machines, or because of the nature or type of the requester or because of a combination of these and/or other such factors.

The solved placement map 914 that may contain one or more acceptable violations of at least partially relaxed latency constraints, and that may contain one or more violations of available capacities of legal regions, may be legalized 918 as described herein at least in connection with FIG. 8 and in accordance with at least one embodiment. The legalized solved placement map 920 does not exceed any available capacities for any legal regions, but does contain a violation of a latency constraint. However, as this single violation only slightly exceeds the constraint, the penalty force of exceeding that constraint may be less than an established threshold value as described herein at least in connection with FIG. 8, thus producing what may be considered an acceptable solution for placing the capacity requests.

Figure 10:
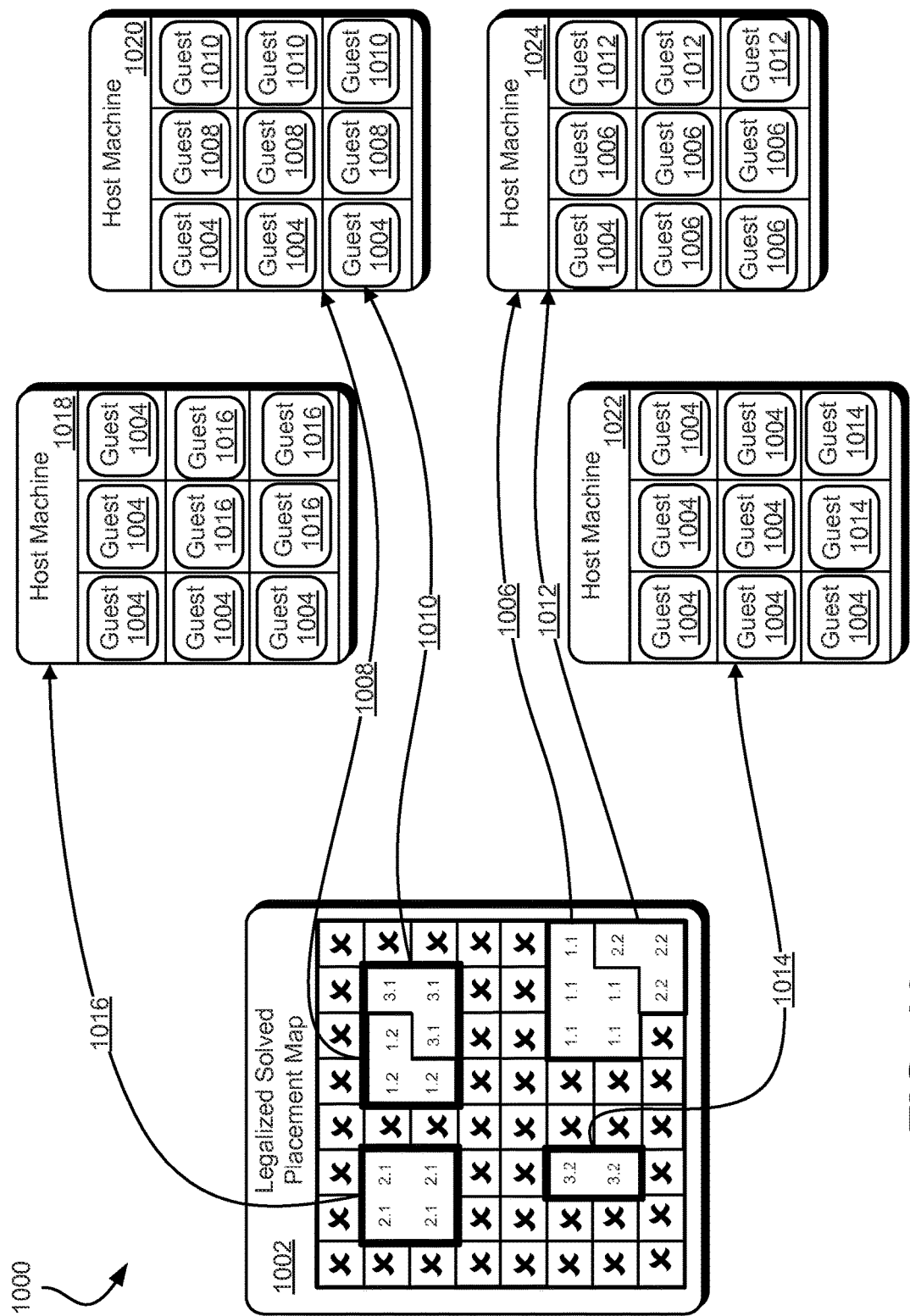
FIG. 10 illustrates an example environment where guest virtual machines are placed and instantiated in a distributed and/or virtual computer system in accordance with at least one embodiment.

FIG. 10 illustrates an example environment 1000 where guest virtual machines are assigned for placement and instantiated on host machines after an acceptable legalized placement map 1002 has been produced at least in connection with FIG. 8 and in accordance with at least one embodiment. The four host machines 1018, 1020, 1022 and 1024 may already contain one or more guest virtual machines 1004 as described herein at least in connection with FIG. 5. Four guest virtual machines 1016 from the second set of capacity requests may be assigned to host machine 1018. Three guest virtual machines 1008 from the first set of capacity requests and three guest virtual machines 1010 from the third set of capacity requests may be assigned to host machine 1020. Two guest virtual machines 1014 from the third set of available capacity requests may be assigned to host machine 1022. Five guest virtual machines 1006 from the first set of capacity requests and three guest virtual machines 1012 from the second set of capacity requests may be assigned to host machine 1024.

Figure 11:
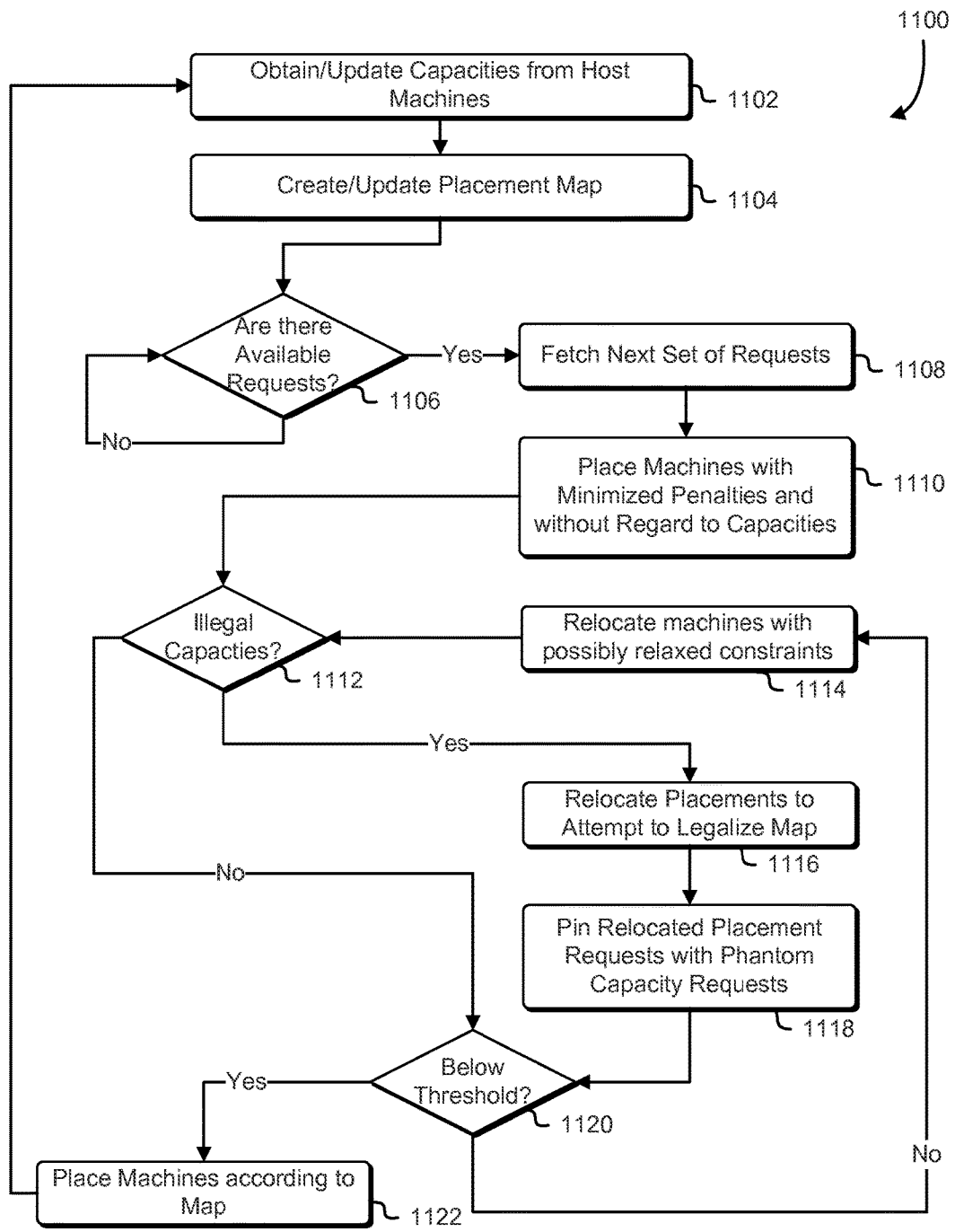
FIG. 11 illustrates an example process for constructing a placement map and iteratively solving the placement map in accordance with at least one embodiment.

FIG. 11 illustrates an example process 1100 for constructing a placement map, retrieving capacity requests, solving the placement map within some acceptable threshold, placing guest virtual machines according to the solved and legalized placement map and for updating the placement map based on the newly placed guest virtual machines as described herein at least in connection with FIGS. 1 and 4 and in accordance with at least one embodiment. The process illustrated in FIG. 11 may be performed by one or more placer processes as described herein at least in connection with FIG. 1 and in accordance with at least one embodiment.

The placer first 1102 queries at least some of the host machines on a computer system for their available capacities within legal regions. The requested available capacities may be based on a simple numerical value, or based on a calculated available capacity based on a variety of factors including, but not limited to, current available resources, predicted available resources, the nature and/or business value of the guest machines already running on the host machines, the nature and/or business value of the applications running on the host machines, the nature of the owner of the guest machines already running on the system or a combination of these and/or other such factors. The placer may next 1104 creates a placement map as described herein at least in connection with FIG. 1. Next, the placer may 1106 examine the ready capacity requests and when it finds requests, it may 1108 retrieve one or more sets of requests and may 1110 place them in an initial solved placement map without regard to available capacities as described herein at least in connection with FIG. 8 and in accordance with at least one embodiment.

The placer may then iterate on the map, first it may determine 1112 whether there are any illegal capacities and, if there are, it may attempt to address those illegalities by 1116 relocating placement requests to different legal regions as described herein at least in connection with FIG. 8 and in accordance with at least one embodiment and possibly by 1118 pinning one or more relocated placement requests to certain regions with phantom capacity requests also as described herein at least in connection with FIG. 8 and also in accordance with at least one embodiment. Once it has legalized the map by relocating capacity requests and/or pinning capacity requests to legal regions with phantom capacity requests, the placer may then 1120 evaluate the map to determine whether the legalized map is an acceptable solution for the retrieved placement requests according to a threshold value as described herein at least in connection with FIG. 8. If the proposed solution does not fall within a threshold value, the placer may iterate on the map, first 1114 relocating one or more capacity requests in an attempt to satisfy constraints before once again 1112 evaluating the map for legality. In the event that the placer does reach an acceptable solution, the placer may 1122 place the machines and then 1102 obtain new information about the available capacities on the system in order to produce a new placement map.

As may be contemplated, in some embodiments and for some available capacity request sets, the placer may not be able to produce a solved map within a threshold value that also does not violate available capacity values. In such embodiments, the placer may perform one or more mitigating operations. For example, the placer may decide that one or more of the sets of requests are too large and/or complex to run in the current system in combination with the other systems and/or requests. In such an example, the placer may return such large and/or complex set of requests to the list of ready requests for later processing. Conversely, the placer may determine that the large and/or complex request set is more important and may take actions to ensure it runs including, but not limited to, returning other requests to the list of ready requests, querying the system to determine if the available capacity map may have changed, suspending and evicting running guest machines to free up available capacity, or combinations of these and/or other such mitigating methods.

Figure 12:
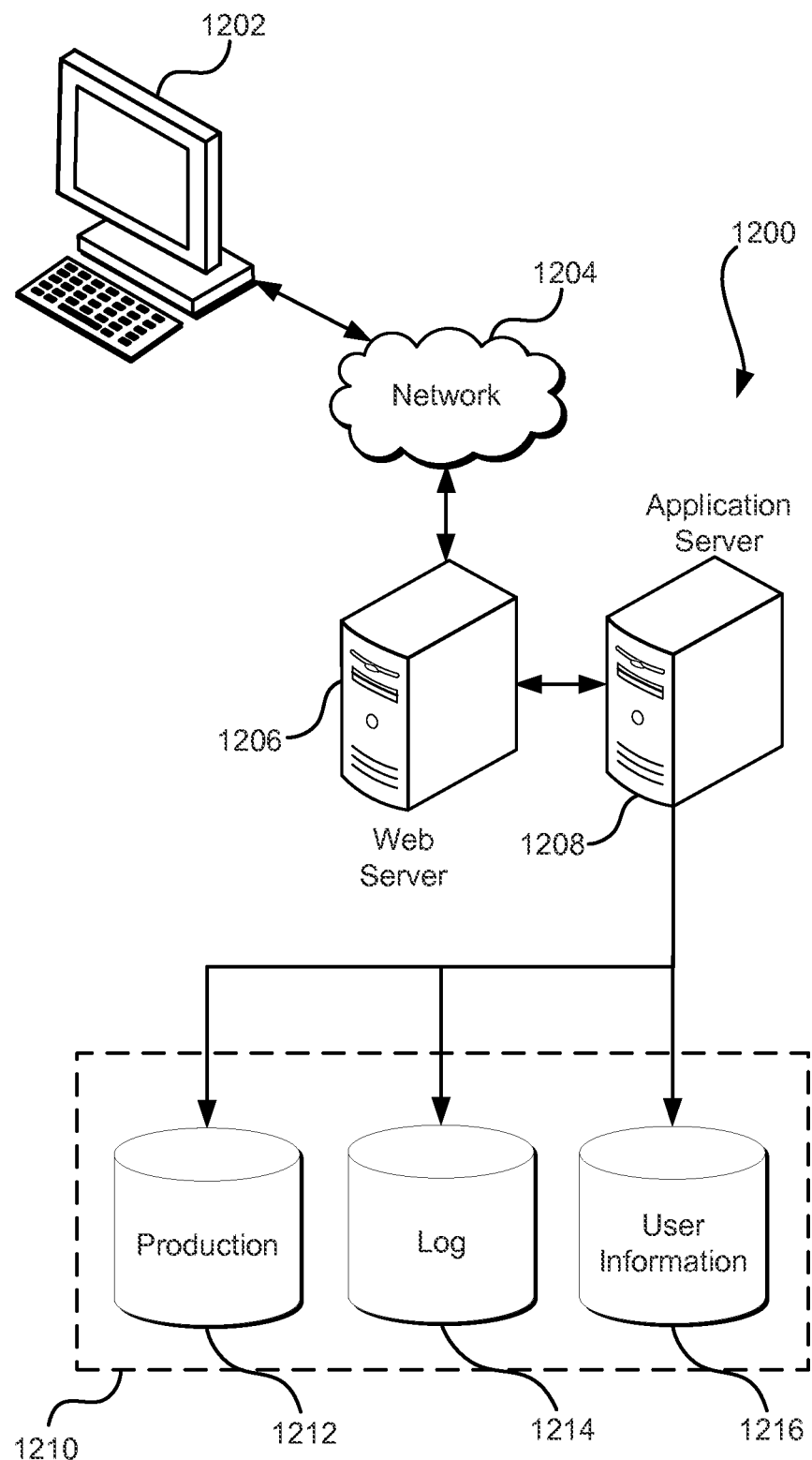
FIG. 12 illustrates an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and receive requests, messages or information over an appropriate network 1204 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 1202 and the application server 1208, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 1210 can include several separate data tables, databases or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C,"

unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for placing one or more guest computing system instances in a virtualized computing system, comprising:
   under the control of one or more computer systems configured with executable instructions,
      creating a placement map comprising regions corresponding to one or more available capacity measurements of one or more host machines in the virtualized computing system; and
      as a result of retrieving one or more capacity requests to place the one or more guest computing system instances in the virtualized computing system from a capacity request queue, at least:
         determining an initial placement for fulfilling the one or more capacity requests by assigning the one or more capacity requests to the regions based at least in part on one or more constraints for fulfilling the one or more capacity requests, the regions to which the one or more capacity requests are assigned forming assigned regions;
         after selecting the initial placement, determining an assignment of the one or more capacity requests to the assigned regions by, until it is determined that the placement map satisfies an objective function at least to within a threshold value, by iteratively:
            legalizing the placement map by reassigning at least one capacity request of the one or more capacity requests to the assigned regions based at least in part on the one or more available capacity measurements of the virtualized computing system;
            pinning a subset of the one or more capacity requests to the assigned regions by adding the one or more constraints between one or more capacity regions and the assigned regions; and
            reassigning the at least one capacity request of the one or more capacity requests to at least one other region based at least in part on the one or more constraints for fulfilling the one or more capacity requests; and
         after it is determined that the placement map satisfies the objective function, placing the one or more of the guest computing system instances in the virtualized computing system based at least in part on the assignment of the one or more capacity requests.

2. The computer-implemented method of claim 1, wherein the placement map is configured such that distances between two regions from the regions in the placement map correspond at least in part to communications latencies between host machines from the one or more host machines associated with the two regions.

3. The computer-implemented method of claim 1, wherein the placement map is configured such that distances between two regions from the regions in the placement map correspond at least in part to available communications bandwidth between host machines from the one or more host machines associated with the two regions.

4. The computer-implemented method of claim 1, wherein determining the assignment further comprises delaying fulfillment of a subset of the one or more capacity requests retrieved by returning the subset of the one or more capacity requests to the capacity request queue.

5. The computer-implemented method of claim 1, wherein the pinning the subset of the one or more capacity requests to the assigned regions includes at least:
   creating one or more phantom capacity requests;
   placing the one or more phantom capacity requests in the assigned regions; and
   adding constraints between the one or more phantom capacity requests and the one or more capacity requests in the subset of the one or more capacity requests.

6. The computer-implemented method of claim 1, wherein the objective function is based at least in part on one or more of: latency between the one or more host machines, available bandwidth between the one or more host machines, physical distance between the one or more host machines, packet loss between the one or more host machines or failure rate between the one or more host machines.

7. The computer-implemented method of claim 1, wherein solving the placement map by reassigning at least one of the one or more capacity requests to at least one other region from the regions based at least in part on the objective function, further includes at least relaxing a subset of the constraints.

8. The computer-implemented method of claim 1, wherein the threshold value is based at least in part on a length of time that it takes a computer system from the one or more computer systems to determine that the placement map satisfies the objective function.

9. A computer system, comprising:
one or more processors; and
a memory including executable instructions that, when executed by the one or more processors, cause the computer system to, as a result of retrieving one or more capacity requests to place one or more guest computing system instances in a virtualized computing system, at least:
optimize a placement map comprised of one or more regions corresponding to one or more available capacity measurements of the virtualized computing system by causing the computer system to at least:
solve the placement map by assigning a first subset of the one or more capacity requests to the one or more regions based at least in part on an objective function for fulfilling the one or more capacity requests; and
when the solved placement map results in an illegal assignment of the one or more capacity requests to regions from the one or more regions, legalize the placement map by causing the computer system to at least:
restrict a second subset of the one or more capacity requests from being reassigned to at least one other region from the one or more regions by causing the system to pin a subset of the one or more capacity requests to a chosen region by adding constraints between the one or more capacity requests and the chosen region; and
reassign a third subset of the one or more capacity requests to the at least one other region based at least in part on the one or more available capacity measurements of the virtualized computing system; and
provide a capacity allocation that corresponds at least in part to the placement map.

10. The computer system of claim 9, wherein the executable instructions further comprise instructions that cause the system to, prior to optimizing the placement map, initially assign the one or more capacity requests to the one or more regions on the placement map based on one or more constraints for fulfilling the one or more capacity requests.

11. The computer system of claim 9, wherein the executable instructions further comprise instructions that cause the system to place at least one of the one or more guest computing system instances in the virtualized computing system based at least in part on the capacity allocation provided.

12. The computer system of claim 9, wherein the executable instructions that optimize the placement map further comprise instructions that cause the system to at least:
after the placement map is solved by assigning at least one of the one or more capacity requests, obtain a first measurement of assignments based at least in part on the objective function;
after the placement map is legalized:
obtain a second measurement of the assignments based at least in part on the objective function; and
perform an analysis of the first measurement and the second measurement based at least in part on a threshold value; and
provide a quality assessment of the placement map based at least in part on the analysis.

13. The computer system of claim 12, wherein the threshold value is based at least in part on a length of time that it takes the computer system to determine that the placement map satisfies the objective function.

14. The computer system of claim 9, wherein the executable instructions that optimize the placement map further comprise instructions that cause the system to at least delay fulfilling of a subset of the one or more capacity requests retrieved by returning the subset of capacity requests to the computer system for later processing.

15. The computer system of claim 9, wherein the objective function is based at least in part on one or more of:
latency between one or more host machines,
available bandwidth between the one or more host machines,
physical distance between the one or more host machines,
packet loss between the one or more host machines, or
failure rate between the one or more host machines.

16. The computer system of claim 9, wherein the executable instructions that solve the placement map by assigning at least one of the one or more capacity requests to the one or more regions based at least in part on the objective function further comprise instructions that cause the system to at least relax one or more constraints between the one or more capacity requests.

17. A non-transitory computer-readable storage medium having collectively stored thereon executable instructions that, when executed by one or more processors of a computer system, cause the computer system to at least:
update a placement map by at least updating one or more available capacity measurements of one or more host machines in a virtualized computing system;
solve the updated placement map by assigning one or more capacity requests to one or more regions based at least in part on an objective function for fulfilling the one or more capacity requests;
restrict a first subset of the one or more capacity requests from being reassigned to at least one other region from the one or more regions by causing the system to pin a subset of the one or more capacity requests to a chosen region from the one or more regions by adding constraints between the subset of capacity requests and the chosen region;
legalize the solved placement map by reassigning a second subset of the one or more capacity requests to the at least one other region based at least in part on the one or more available capacity measurements of the virtualized computing system; and
provide a capacity allocation that corresponds at least in part to the placement map.

18. The non-transitory computer-readable storage medium of claim 17, wherein the executable instructions further comprise instructions that cause the computer system to, after legalizing the solved placement map, at least iteratively:

assign the one or more capacity requests to the one or more regions based at least in part on the objective function for fulfilling the one or more capacity requests;

restrict the first subset of the one or more capacity requests from being reassigned to the at least one other region; and legalize the placement map with restricted capacity requests by reassigning the second subset of the one or more capacity requests to the at least one other region based at least in part on the available capacity measurements of the virtualized computing system.

19. The non-transitory computer-readable storage medium of claim 17, wherein the executable instructions further comprise instructions that cause the computer system to, prior to optimizing the placement map, at least:

create an initial placement map comprised of regions from the one or more regions corresponding to the one or more available capacity measurements of the virtualized computing system.

20. The non-transitory computer-readable storage medium of claim 17, wherein the executable instructions further comprise instructions that cause the computer system to, after providing the capacity allocation, place one or more guest computing system instances in the virtualized computing system based at least in part on the capacity allocation provided.

21. The non-transitory computer-readable storage medium of claim 17, wherein the executable instructions that cause the computer system to provide the capacity allocation that corresponds at least in part to the placement map, further include instructions that cause the computer system to at least:

obtain a first measurement of assignments based at least in part on the objective function;

obtain a second measurement of the assignments based at least in part on the objective function;

compare a difference between the first measurement and the second measurement against a threshold value to produce a comparison; and provide a quality assessment of the capacity allocation based at least in part on the comparison.

22. The non-transitory computer-readable storage medium of claim 21, wherein the threshold value is based at least in part on a length of time that it takes the computer system to determine that the placement map satisfies the objective function.

23. The non-transitory computer-readable storage medium of claim 17, wherein the objective function is based at least in part on one or more of: latency between the one or more host machines, available bandwidth between the one or more host machines, physical distance between the one or more host machines, packet loss between the one or more host machines and failure rate between the one or more host machines.

24. The non-transitory computer-readable storage medium of claim 17, wherein the executable instructions that cause the computer system to optimize the placement map further include instructions that cause the computer system to at least:

select at least one of the one or more capacity requests for delayed processing; and mark the at least one of the one or more capacity requests as delayed.

25. The non-transitory computer-readable storage medium of claim 17, wherein the executable instructions further comprise instructions that cause the computer system to at least:

before updating the placement map, create an initial placement map based at least in part on physical distance between the one or more host machines; and before solving the updated placement map, distort the updated placement map based at least in part on one or more of: latency between the one or more host machines, available bandwidth between the one or more host machines, packet loss between the one or more host machines or failure rate between the one or more host machines.

\* \* \* \* \*